(12) United States Patent
Miyadera

(10) Patent No.: US 6,819,357 B1
(45) Date of Patent: Nov. 16, 2004

(54) CAMERA HAVING A ZOOM LENS

(75) Inventor: Shunichi Miyadera, Tokyo (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 09/366,733

(22) Filed: Aug. 4, 1999

(30) Foreign Application Priority Data

Aug. 5, 1998 (JP) .......................................... 10-221237

(51) Int. Cl.[7] .............................................. H04N 5/262
(52) U.S. Cl. .................................................. 348/240.1
(58) Field of Search ........................ 348/240.99, 240.1, 348/240.2, 240.3, 333.01, 335, 340, 341, 64; 359/676; 396/529, 60, 373, 374, 379

(56) References Cited

U.S. PATENT DOCUMENTS

| | | | | |
|---|---|---|---|---|
| 5,134,432 A | | 7/1992 | Kohmoto et al. | |
| 5,179,478 A | * | 1/1993 | Aoki | 348/240.99 |
| 5,420,632 A | * | 5/1995 | Yamagiwa | 348/240.99 |
| 5,493,353 A | * | 2/1996 | Chen | 348/220 |
| 5,543,837 A | * | 8/1996 | Aoki et al. | 348/240.99 |
| 5,557,328 A | * | 9/1996 | Ishihama et al. | 348/240.99 |
| 5,835,641 A | * | 11/1998 | Sotoda et al. | 348/240.99 |
| 5,867,741 A | * | 2/1999 | Maruyama et al. | 396/374 |
| 5,870,638 A | * | 2/1999 | Kurosawa | 396/267 |
| 5,966,553 A | * | 10/1999 | Nishitani et al. | 396/374 |
| 6,031,998 A | * | 2/2000 | Shono | 396/374 |
| 6,046,770 A | * | 4/2000 | Uemura et al. | 348/240.99 |
| 6,522,360 B1 | * | 2/2003 | Miyawaki et al. | 348/240.2 |

FOREIGN PATENT DOCUMENTS

JP          5-83612          4/1993

* cited by examiner

Primary Examiner—Wendy R. Garber
Assistant Examiner—Rashawn N Tillery
(74) Attorney, Agent, or Firm—Greenblum & Bernstein, P.L.C.

(57) ABSTRACT

A camera includes: a zoom lens, having a first zoom mechanism, for photographing an image of an object; a focal length setting device which controls the zoom mechanism to set a focal length of the zoom lens; and a electronic monitoring device for visually displaying the object image. The electronic monitoring device displays the object image which corresponds to the focal length set by the focal length setting device at all times. The focal length setting device actuates the zoom mechanism to set the focal length of the zoom lens at a set focal length only at the time immediately before a photographing operation is carried out.

12 Claims, 5 Drawing Sheets

CAMERA HAVING A ZOOM LENS

BACKGROUND OF THE INVENTION

1. Field of the Invention

The present invention relates to a camera having a zoom lens, and more particularly, relates to a camera having a zoom lens which can use both a photosensitive film and an image pick-up device such as a CCD for taking pictures.

2. Description of the Related Art

In recent years, a still camera using both a photosensitive film (e.g., silver-halide film) and an image pick-up device (e.g., a CCD) for taking pictures has been proposed. In this type of camera, an object image is focused on either the photosensitive film or the image pick-up device when the object image is photographed. When the object image is photographed using the image pick-up device, the object image is recorded in the form of image signals. If such type of camera is provided with a zoom lens, a state of zooming of the zoom lens can be viewed through the viewfinder if the camera is an SLR (single-lens-reflex) camera; i.e., the magnification of the viewfinder changes synchronously with the variation of the focal length of the zoom lens. However, in a camera in which the optical viewfinder is provided independently of the zoom lens, in order to make the magnification of the viewfinder change synchronously with the variation of the focal length of the zoom lens, it is necessary to provide the camera with a viewfinder zoom mechanism for the optical viewfinder in addition to the photographic lens zoom mechanism, wherein these two zoom mechanisms need to be driven in association with each other when the zooming operation is carried out.

Accordingly, in the camera in which the optical viewfinder is provided independently of the zoom lens and uses both a photosensitive film and an image pick-up device, both the optical viewfinder zoom mechanism and the photographic lens zoom mechanism are driven when the zooming operation is carried out. When the zooming operation is carried out, the photographic lens zoom mechanism consumes much electric power because (in general) at least one lens group having a relatively large diameter in the zoom lens needs to be driven. Power consumption is therefore high, which cannot be ignored. In a photographic operation with such a camera, the focal length is generally changed repeatedly to obtain a desired focal length while changing the angle of view before a shutter is released. Such an operation requires both the optical viewfinder zoom mechanism and the photographic lens zoom mechanism to also be driven repeatedly, consuming a considerable amount of electric power, shortening the battery life span. In order to overcome this problem, a camera having a zoom lens and a fixed-focus optical viewfinder has been proposed. This camera consumes less power because it is not necessary to provide the camera with any drive mechanism for electrically driving the optical viewfinder. However, this type of camera still consumes a considerable amount of battery power, as the photographic lens zoom mechanism is repeatedly driven before a shutter release.

SUMMARY OF THE INVENTION

The primary object of the present invention is to provide a camera having a zoom lens wherein power consumption for the zooming operation of the camera is reduced by limiting the zooming operation of the zoom lens and/or the optical viewfinder of the camera.

To achieve the object mentioned above, according to an aspect of the present invention, there is provided a camera including: a zoom lens, having a first zoom mechanism, for photographing an image of an object; a focal length setting device which controls the zoom mechanism to set a focal length of the zoom lens; and a electronic monitoring device for visually displaying the object image; wherein the electronic monitoring device displays the object image which corresponds to the focal length set by the focal length setting device at all times; and the focal length setting device actuates the zoom mechanism to set the focal length of the zoom lens at a set focal length only at the time immediately before a photographing operation is carried out.

Preferably, the camera is also provided with: an optical viewfinder provided independently of the zoom lens; an image pick-up device positioned in either an optical system of the zoom lens or an optical system of the viewfinder; and a signal processing circuit for processing image signals output from the image pick-up device to display the image signals as an image on the electronic monitoring device. The signal processing circuit includes an electronic zoom circuit for performing an electronic zoom process in which only a portion of image signals obtained from the image pick-up device are processed to display an enlarged image corresponding to the portion of image signals on the electronic monitoring device, the portion of image signals corresponding to the focal length set by the focal length setting device.

Preferably, the camera is also provided with: a second zoom mechanism for moving at least one optical element of the optical viewfinder; wherein the first zoom mechanism is for moving at least one optical element of the zoom lens; the first zoom mechanism engages with the second zoom mechanism so that a focal length of the optical viewfinder varies according to the variation of the focal length of the zoom lens, and the image pick-up device is positioned in the optical viewfinder.

Preferably, the camera is also provided with: a distance measuring device for measuring an object distance of the object to obtain distance data; a distance-data detector for repeatedly detecting the distance data; and an actuating device for actuating the first zoom mechanism, so that the focal length setting device actuates the zoom mechanism to set the zoom lens at the set focal length immediately after the number of detections of the distance-data detector reaches a predetermined number when a value of the distance data is within a predetermined value.

Preferably, the distance-data detector repeatedly detects the distance data at predetermined intervals when a release button of the camera is half depressed.

Preferably, the focal length setting device actuates the first zoom mechanism to set the zoom lens at the set focal length when the set focal length is smaller than a current focal length of the zoom lens.

Preferably, the focal length setting device does not actuate the first zoom mechanism when the set focal length is equal to or greater than the current focal length of the zoom lens.

Preferably, the focal length setting device actuates the first zoom mechanism to set the focal length of the zoom lens to the set focal length only at a time immediately before a shutter release.

Preferably, the camera includes an optical viewfinder provided independently of the zoom lens.

Preferably, the camera is an SLR camera.

Preferably, the electronic monitoring device is an LCD monitor.

According to another aspect of the present invention, there is provided a camera including: an optical zoom lens system; an optical zoom viewfinder system; a first zoom mechanism for moving at least one optical element of the optical zoom lens system to change the focal length thereof; a second zoom mechanism for moving at least one optical element of the optical zoom viewfinder system to change the focal length thereof, the second zoom mechanism system engaging with the first zoom mechanism system so that a focal length of the optical zoom viewfinder system varies synchronously with variation of a focal length of the optical zoom lens system; an image pick-up device positioned in either the optical zoom lens system or the optical zoom viewfinder system; an electronic monitor for visually displaying an object image obtained through the image pick-up device; an electronic zoom device for performing an electronic zoom process in which a portion of the object image, obtained through the image pick-up device, is enlarged to be displayed on the electronic monitor; and a focal length setting device which controls the first zoom mechanism to set a focal length of the optical zoom lens system; wherein the electronic monitor displays the object image at the focal length set by the focal length setting device at all times, and wherein the focal length setting device actuates the first zoom mechanism to set the optical zoom lens system to the set focal length only at the time immediately before a shutter release.

According to the present invention, since the object image is displayed at the focal length set by the focal length setting device on the electronic monitoring device at all times before taking a picture, the angle of view of the object can be checked by the user of the camera at all times even if the zoom mechanism for driving the zoom lens is not driven. At the time of taking a picture, the focal length of the zoom lens is set at a set focal length by the focal length setting device so that a picture may be taken through the zoom lens. Accordingly, either the zoom mechanism of the zoom lens or the zoom mechanism of the optical viewfinder need not be driven until the moment immediately before the object is photographed, so that the power consumption for the zoom mechanism of the camera can be reduced, extending the life time of battery.

The present disclosure relates to subject matter contained in Japanese Patent Application No. 10-221237 (filed on Aug. 5, 1998) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENT

Figure 1:
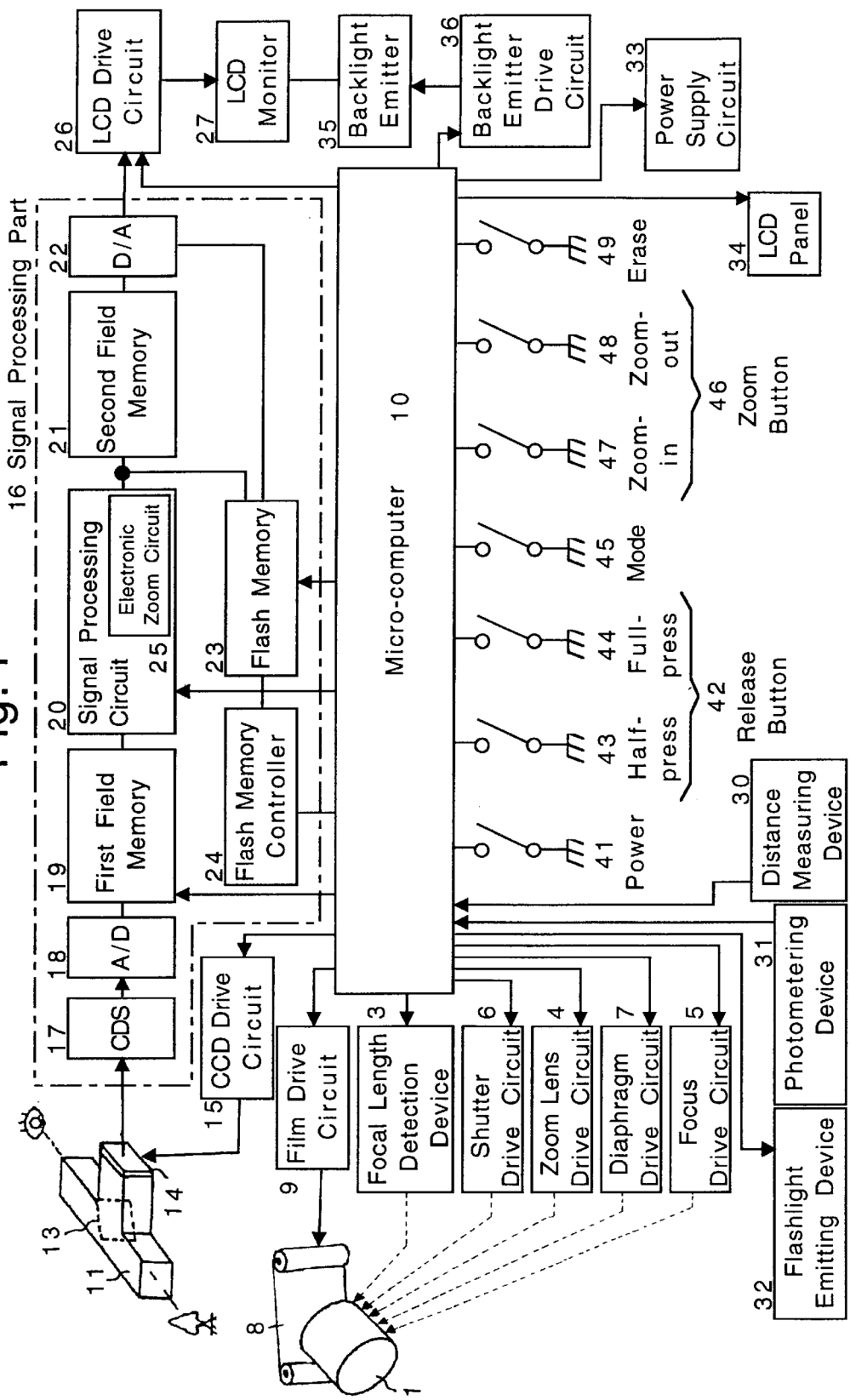
FIG. 1 is a block diagram showing fundamental elements of an embodiment of a camera to which the present invention is applied.
Figure 2:
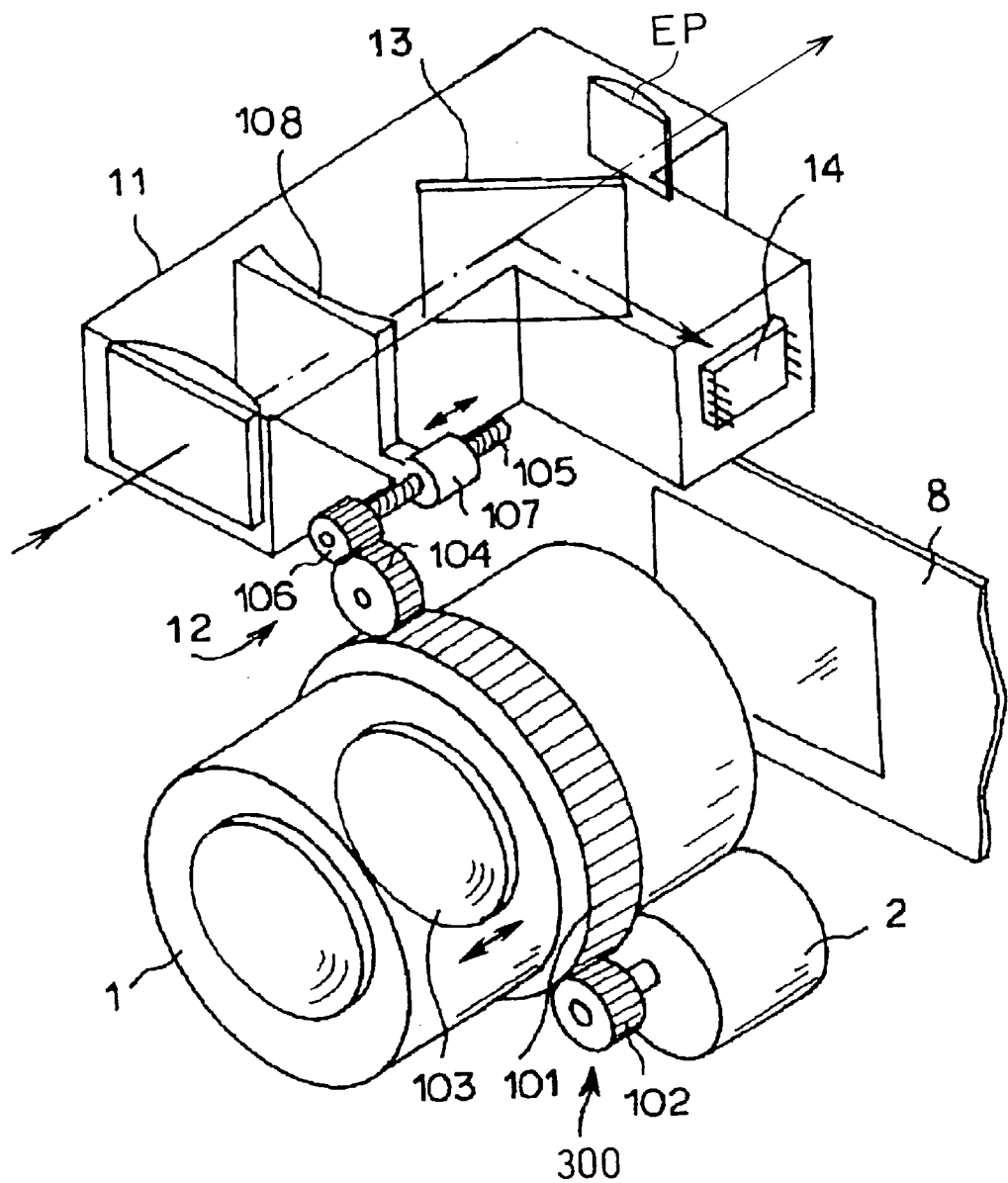
FIG. 2 is a perspective view of a photographic lens and an optical viewfinder of the embodiment shown in FIG. 1.

As shown in FIGS. 1 and 2, the camera is provided with a photographic lens (zoom lens) 1, a focal length detection device 3, a zoom lens drive circuit 4, a focus drive circuit 5, a shutter drive circuit 6, a diaphragm drive circuit 7, a film drive circuit 9, a microcomputer 10, an optical zoom viewfinder 11, a CCD (image pick-up device) 14, a CCD drive circuit 15, a CDS 17, an A/D converter 18, a first field memory 19, a signal processing circuit 20, a second field memory 21, a D/A converter 22, a flash memory 23, a flash-memory controller 24, an LCD drive circuit 26, an LCD monitor (electronic monitoring device) 27, a power source circuit 33, an LCD panel 34, a backlight emitter 35 and a backlight emitter drive circuit 36.

The photographic lens 1 is constructed as an optical zoom lens which is provided with a photographic lens zoom mechanism 300 (see FIG. 2). The zoom mechanism 300 is provided with a zoom motor 2, as a drive source thereof, which is positioned adjacent to the photographic lens 1. The zoom motor 2 is driven by the zoom lens drive circuit 4 to vary the focal length of the photographic lens 1, and the varied focal length is detected by the focal length detection device 3. The focal length detection device 3 which constitutes part of the zoom mechanism 300 includes, for example, an encoder (not shown) for detecting the amount of rotation of the zoom gear 101, and a potentiometer (not shown) for detecting the position of the movable lens group 103 along the optical axis. Furthermore, the focal detection device 3 is arranged so as to input the detected focal length into the mirocomputer 10. The photographic lens 1 is provided with the focus drive circuit 5, the shutter drive circuit 6 and the diaphragm drive circuit 7, which are each controlled by the microcomputer 10. An image of an object is focused on a photosensitive film 8 (e.g., a sliver-halide 35 mm film) through the photographic lens 1 to thereby form a latent image on the photosensitive film 8. The photosensitive film 8 is wound and unwound by the film drive circuit 9 which is controlled by the microcomputer 10.

The optical viewfinder 11 is constructed as a zoom viewfinder which can change the angle of view thereof synchronously with the variation of the angle of view (photographing operation) of the photographic lens 1. As can be seen in FIG. 2 the camera is provided, between the photographic lens 1 and the optical viewfinder 11, with a viewfinder zoom mechanism 12. The viewfinder zoom mechanism 12 engages with the photographic lens zoom mechanism 300, so that the magnification of the optical viewfinder 11 changes synchronously with the variation of the focal length of the photographic lens 1. The optical viewfinder 11 is provided therein with a half-mirror 13. The CCD 14 and an eye piece EP are positioned on a reflection optical axis and a transmission optical axis of the half-mirror 13, respectively, so that the object light (light from an object) is seen through an eyepiece EP of the viewfinder 11 and is incident onto the CCD 14. The CCD 14 converts the incident light into electrical charges to output image signals.

In the photographic lens zoom mechanism 300 and the viewfinder zoom mechanism 12 shown in FIG. 2, a zoom gear 101 is formed around the photographic lens 1. A pinion gear 102 fixed to the drive shaft of the zoom motor 2 is engaged with the zoom gear 101. Rotating the zoom gear 101 about the optical axis of the photographic lens 1 by rotating the pinion gear 102 of the zoom motor 2 causes a movable lens group 103 of the photographic lens 1 to move along the optical axis through a helicoid mechanism (not shown) provided in the photographic lens 1 to thereby vary the focal length of the photographic lens 1.

The optical viewfinder 11 is provided with a movable lens 108 which is guided along the viewfinder optical axis. A boss 107 having a female-threaded hole is integral with the movable lens 108, and a screw shaft 105 having a pinion 106 at the front end thereof is engaged with the threaded hole of the boss 107. A pinion 104 is arranged between the pinion 106 and the zoom gear 101 to stay in mesh with both the pinion 106 and the zoom gear 101 so as to transmit the rotation of the zoom gear 101 to the pinion 106 of the screw shaft 105. According to this structure, rotation of the zoom gear 101 is transmitted to the screw shaft 105 via the pinions 104 and 106. Rotating the screw shaft 105 causes the movable lens 108 to move along the viewfinder optical axis to thereby vary the focal length (magnification) of the optical viewfinder 11.

The CCD 14 is controlled by the CCD drive circuit 15 which is controlled by the microcomputer 10. Image signals output from the CCD 14 are input into the signal processing part (signal processor) 16 which includes the CDS 17, the A/D converter 18, the first field memory 19, the signal processing circuit 20, the second field memory 21, the D/A converter 22, the flash memory 23 and the flash-memory controller 24. In the signal processing part 16, the CDS circuit 17, to which image signals are input from the CCD 14, filters out (suppresses) the noise included in the input image signals by correlation-double-sampling and subsequently the A/D converter 18 converts the analogue image signals output from the CDS 17 into digital signals to output the image data to the first field memory 19. The image data input into the first field memory 19 is temporarily stored therein. The signal processing circuit 20 reads the image data from the first field memory in a predetermined order, to perform shading correction, gamma correction, compression and other operations. The image data processed by the signal processing circuit 20 is temporarily stored in the second field memory 21 and is subsequently read therefrom in a predetermined order by the D/A converter 22. The D/A converter converts the input digital image data into analogue image signals to output the same as video signals to the LCD drive circuit 26.

The aforementioned image data, which has been processed by the signal processing circuit 20, is stored in the flash memory 23 in response to the control of the flash-memory controller 24 when the shutter is released. The signal processing circuit 20 is provided therein with an electronic zoom circuit (digital zoom circuit) 25. The electronic zoom circuit 25 can perform an electronic zoom process for the digital image signals input from the first field memory 19 to store the processed digital image signals in the second field memory 21. Video signals output from the signal processing part 16 are input into the LCD drive circuit 26 to be displayed as an image on the LCD monitor 27.

The present embodiment of the camera is further provided with a distance measuring device 30, a photometering device 31 and a flashlight emitting device 32 which are each controlled by the microcomputer 10. The flashlight emitting device 32 can emit not only regular flashlight but also AF auxiliary light for the auto-focusing in low-light conditions. The power supply circuit 33, the LCD panel 34, the backlight emitter 35 and the backlight emitter drive circuit 36 are connected to the microcomputer 10. Various photographic information including the number of exposed frames are indicated on the LCD panel 34. The backlight emitter drive circuit 36 controls the backlight emitter 35 of the LCD panel 34. The camera is further provided with a power switch 41, a half-press switch 43, a full-press switch 44, a photographic mode select switch 45, a zoom-in switch 47, a zoom-out switch 48 and a photographed-data erase switch 49, which are connected to the microcomputer 10 wherein the microcomputer 10 controls predetermined operations according to the ON/OFF states of these switches. The half-press switch 43 is turned ON when the release button 42 of the camera is half depressed while the full-press switch 44 is turned ON when the release button 42 is fully depressed. The zoom-in switch 47 and the zoom-out switch 48 are each turned ON and OFF accordingly, as a zoom button or knob 46 (generally provided on the camera body) is manually operated. The photographic mode select switch 45 selects one of the four photographic modes (a normal photographic mode M1, an electronic monitor photographic mode M2, a digital photographic mode M3, or a dual photographic mode M4).

Figure 3:
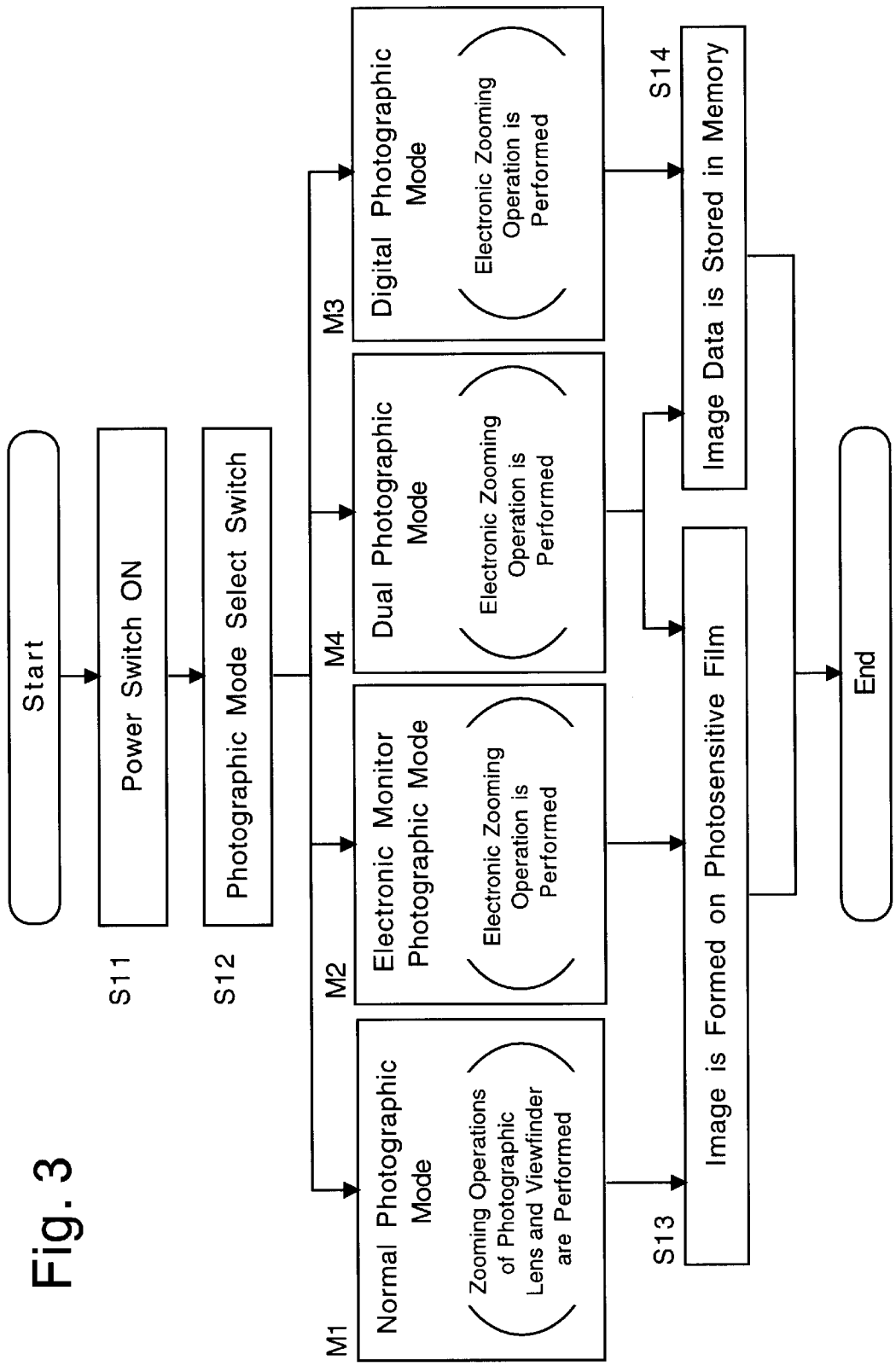
FIG. 3 is a flow chart showing the operation of the camera in each photographic mode.

The photographic operation of the present embodiment of the camera having the aforementioned structure will be hereinafter discussed with reference to the flow chart shown in FIG. 3. When the power switch 41 is turned ON, the microcomputer 10 checks the state of the photographic mode select switch 45 (i.e., which one of the four photographic modes mentioned above has been selected) to set the currently-selected photographic mode (step S12). In the normal photographic mode M1, the photosensitive film 8 is used to take a picture of an object while the user of the camera is viewing the object through the optical viewfinder 11. In the electronic monitor photographic mode M2, the photosensitive film 8 is used to take a picture of the object while the user of the camera is viewing the object displayed on the LCD monitor 27. In the digital photographic mode M3, the flash memory 23 is used to store the photographic data of the object therein, rather than the photosensitive film 8 to take a picture of the object while the user of the camera is viewing the object displayed on the LCD monitor 27. In the dual photographic mode M4, the photosensitive film 8 is used to take a picture of the object, and at the same time, the flash memory 23 is used to store the photographic data of the same object therein to take a picture thereof while the user of the camera is viewing the object displayed on the LCD monitor 27. By manually operating the photographic mode switch 45, the user can freely select any one of the four photographic modes M1 through M4.

In the normal photographic mode M1, the microcomputer 10 controls the CCD drive circuit 15 to stop the operation of the CCD 14. Accordingly, the user takes a picture of the object with the photosensitive film 8 by operating the release button 42 while viewing the object through the optical viewfinder 11. The distance measuring operation and the photometering operation are carried out when the release switch 42 is half depressed; i.e., when the half-pressed switch 43 is turned ON. Thereafter, the diaphragm drive circuit 7 and the shutter drive circuit 6 operate to take a picture when the release switch 42 is fully depressed; i.e., when the full-press switch 44 is turned ON. In such a photographic operation, manually operating the zoom button 46 to turn ON the zoom-in switch 47 or the zoom-out switch 48 causes the photographic lens zoom mechanism 300 of the photographic lens 1 to change the focal length thereof to perform zooming while synchronously changing the focal length of the optical viewfinder 11 via the viewfinder zoom mechanism 12. This makes it possible for the user to take pictures on the photosensitive film 8 while visually checking the variation of the angle of view through the optical viewfinder 11 (step S13).

In the digital photographic mode M3, the microcomputer controls the CCD drive circuit 15 to operate the CCD 14 and further controls the signal processing part 16 to process the image signals output from the CCD 14. Namely, the noise included in the image signals are filtered out via the CDS circuit 17, and subsequently, the image signals are converted into digital signals via the A/D converter 18 to obtain image data. Thereafter, the obtained image data is processed in a predetermined manner through the first field memory 19, the signal processing circuit 20, and the second field memory 21, to be output as analogue video signals from the D/A converter 22. The output video signals are input into the LCD monitor 27 via the LCD drive circuit 26 to be displayed as an image on the LCD monitor 27. At this time, fully depressing the release button 42 causes the microcomputer 10 to control the signal processing circuit 20 to compress the obtained image data and store the same in the flash memory 23 (step S14). The stored image data can be displayed on the LCD monitor 27 at any time. In the digital photographic mode M3, it is possible to take pictures while driving the optical zoom viewfinder 11 to perform optical zooming thereof by operating the zoom button 46. However, in the digital photographic mode M3, the electronic zoom process is performed in the electronic zoom circuit 25 in a state before the release button 42 is operated. The image data obtained through electronic zoom process is displayed on the LCD monitor 27. The details of the electronic zoom process will be discussed in the following explanation about the electronic monitor photographic mode M2.

Figure 4:
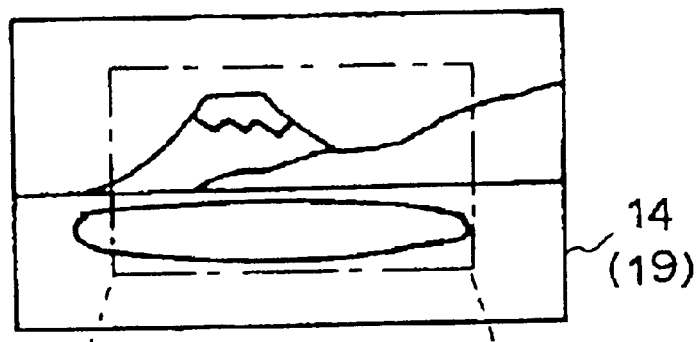
FIGS. 4A and 4B are explanatory views for illustrating the operation of the electronic zoom.
Figure 4:
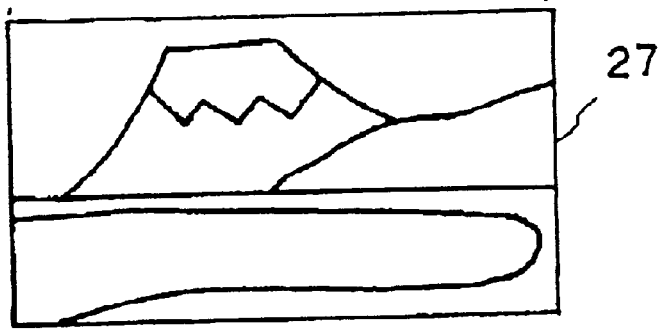

In the electronic monitor photographic mode M2, the image signals output from the CCD 14 are processed in the electronic zoom circuit 25 of the signal processing circuit to be displayed as an image on the LCD monitor 27. The electronic zoom circuit 25 can input only that portion of the image data stored in the first field memory 19 which is to be displayed as an enlarged image on the LCD monitor 27. The portion of the image data input into the electronic zoom circuit 25 is processed so that the number of scanning lines corresponding to the focal length are interpolated in the portion of the image data. Video signals are generated in accordance with the scanning-line-interpolated portion of the image data to be displayed on the LCD monitor 27. This makes it possible to obtain an enlarged video image (close-up) which is horizontally and vertically enlarged. Such a zooming operation is also disclosed in (for example) Japanese Laid-Open Patent Publication No. 5-83612. For example, if the image shown in FIG. 4A is displayed on the LCD monitor 27, portion of the image shown by a rectangular chain line in FIG. 4A is selected. This selected portion is enlarged to be displayed on the LCD monitor 27 as shown in FIG. 4B, completing the electronic zoom process.

In the electronic monitor photographic mode M2 of the present embodiment of the camera, neither the zooming operation of the photographic lens 1 nor the corresponding zooming operation of the optical viewfinder 11 is performed when the zoom button 46 is operated by the user. When the zoom button 46 is operated by the user, the microcomputer 10 detects the state of the focal length detection device 3 and both of the zoom-in switch 47 and the zoom-out switch 48 to set (detect) a focal length. Subsequently, the microcomputer 10 controls the electronic zoom circuit 25 in the signal processing circuit 20 in accordance with the set focal length to display an image corresponding to the set focal length on the LCD monitor 27. Thereafter, when the release button 42 is fully depressed while viewing the image with the desired focal length on the LCD monitor 27 in a state where all the predetermined essential conditions are satisfied, the microcomputer 10 controls the zoom drive circuit 4, while detecting the focal length of the photographic lens 1 by the focal length detection device 3, to move the movable lens group 103 to an axial position thereof wherein the photographic lens 1 is set to the set focal length. Subsequently, upon the completion of this movement of the movable lens group 103, i.e., the completion of the zooming operation, the microcomputer 10 controls the shutter drive circuit 6 to release the shutter to thereby form a latent image on the photosensitive film 8 (step S13).

Figure 5:
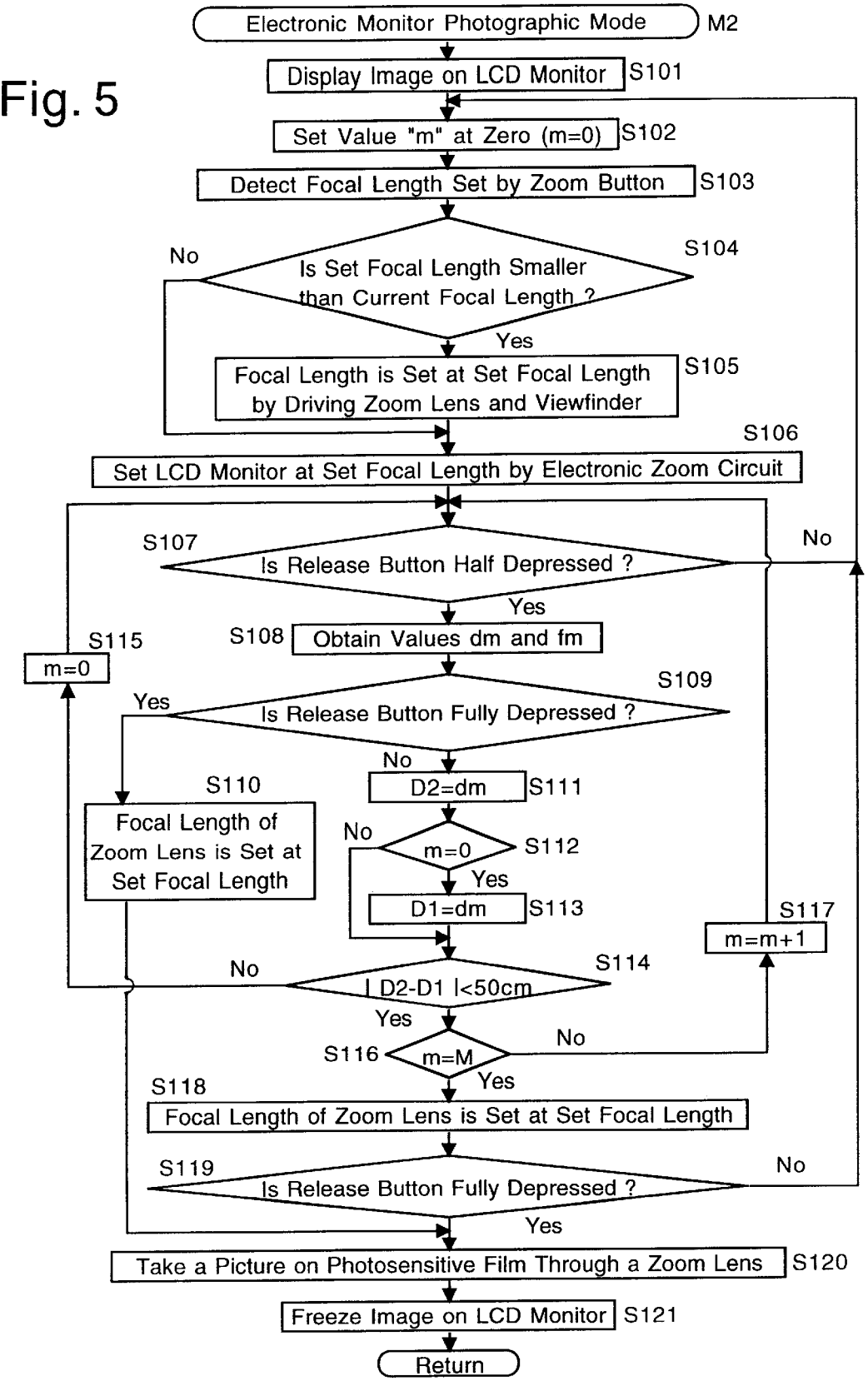
FIG. 5 is a flow chart showing the operation of the electronic monitor photographic mode.

The operation of the camera in the electronic monitor photographic mode M2 will be hereinafter discussed with reference to FIG. 5. Upon determining that the electronic monitor photographic mode M2 is currently selected by the photographic mode select switch 45, the LCD monitor 27 is turned ON by the microcomputer 10 via the LCD drive circuit 26 to display the image on the LCD monitor 27 which can be viewed through the viewfinder 11 (step S101). Subsequently, a counter value (number of object-distance measurements) "m" is initially set at zero (m=0) (step S102). Thereafter the microcomputer 10 detects a focal length manually set by the user of the camera with the zoom button 46 (step S103). The focal length is set for example in accordance with a depressed time of the zoom up switch 47 or the zoom down switch 48 and a current focal length detected by the focal length detection device 3 before the zoom switch 47 or 48 is depressed. The microcomputer 10 subsequently compares the current focal length with the set focal length (step S104). If it is determined at step S104 that the set focal length is smaller than the current focal length (i.e., the set focal length is on the wide angle side of the current focal length), the zoom drive circuit 4 drives the zoom motor 2 so that the focal length of photographic lens 1 is set to the set focal length (step S105), and the focal length of the optical viewfinder 11 is also set to the same set focal length. If it is determined at step S104 that the set focal length is equal to or greater than the current focal length (i.e., the set focal length is on the telephoto side of the current focal length), the zoom drive circuit 4 does not drive the zoom motor 2, i.e., control skips step S105 to proceed to step S106. At step S106 the electronic zoom circuit 25 is actuated to perform the electronic zoom process for the digital image signals obtained from the CCD 14. Due to the electronic zoom process, the object image is displayed as an enlarged image on the LCD monitor 27; namely, the object image which corresponds to the set focal length is displayed on the LCD monitor 27 as if the image were a close-up object image (step S106).

Thereafter the microcomputer 10 monitors the state of the half-press switch 43 (step S107). If it is determined at step S107 that the release button 42 is not half depressed (i.e., the half-press switch 43 is OFF), control returns to step S102. If it is determined at step S107 that the release button 42 is half depressed (i.e., the half-press switch 43 is turned ON), control proceeds to step S108 where the distance measuring circuit 30 and the photometering circuit 31 start working to obtain a value "dm" of the distance measuring data and a value "fm" of the photometry data. Subsequently, it is determined at step S109 whether the release button 42 is fully depressed (i.e., the full-press switch 44 is turned ON). If it is determined at step S109 that the release button 42 is fully depressed, control proceeds to step S110 where the zoom drive circuit 4 is controlled to move the movable lens group 103 so that the photographic lens 1 is set to the set focal length. Thereafter, control proceeds to step S120 where the shutter is released to form a latent image on the photo-sensitive film 8. Conversely, if it is determined at step S109 that the release button 42 is not yet fully depressed, control proceeds to step S111. A distance value "D2" is made equal to the value "dm" (D2=dm) at step S111 and subsequently it is determined at step S112 whether the value "m" is equal to zero (m=0). When it is determined at step S112 that the value "m" is equal to zero, the distance value "D1" is made equal to the value "dm" (D1=dm) (step S113). Conversely, when it is determined at step S112 that the value "m" is not equal to zero, control skips step 113 so that the distance value "D1" maintains the value "dm" at the time of the value "m" being zero. Thereafter, it is determined whether the difference between the distance values D1 and D2 is less than 50 cm (step S114). If it is determined at step S114 that the difference is equal to or larger than 50 cm, it is assumed that the camera has been directed to a different object by the user and control proceeds to step S115 where the value "m" is set at zero. Thereafter control returns to step S107 to repeat a loop including steps S107, S108, S109, S111, S112, S113, S114 and S115 at very short intervals.

However, if it is determined at step S114 that the difference is less than 50 cm, it is assumed that the camera is still directed by the user toward the same object, so that control proceeds to step S116 where it is determined whether the value "m" is equal to a predetermined value "M". In this particular embodiment, the predetermined value "M" is set at five (M=5). If it is determined that the value "m" is not equal to the predetermined value "M", control proceeds to step S117 where the value "m" is increased by one (m=m+1) and then control returns to step S107. Accordingly, if it is determined at step S114 that the difference is less than 50 cm, a loop including the operations at steps S107, S108, S109, S111, S112, S113, S114, S116 and S117 is repeated until the value "m" becomes equal to the predetermined value "M". If no change is detected by the time the loop (including the operations at steps S107, S108, S109, S111, S112, S113, S114, S116 and S117) has been repeated five times, it is assumed that the object to which the camera is currently directed toward will be photographed by the user; and control proceeds to step S118 where the zoom drive circuit 4 is controlled to move the movable lens group 103 so that the photographic lens 1 is set to the set focal length.

Thereafter, it is determined at step S119 whether the release button 42 is fully depressed (i.e., the full-press switch 44 is turned ON). If it is determined at step S119 that the release button 42 is fully depressed, control proceeds to step S120 where the exposure operation is performed according to the photometry value "fm" in the diaphragm drive circuit 7, while the shutter release operation is performed by the shutter drive circuit 6 to form a latent image on the photosensitive film 8. During the exposure operation, the corresponding image data is stored in the second field memory 21 while the same image data is converted into analogue signals to be output as video signals to the LCD drive circuit 26, in order to display the image of the video signals on the LCD monitor 27 as a still image (photographed image) (step S121).

In the dual photographic mode M4, a series of operations of the electronic monitor photographic mode M2 and a series of operations of the digital photographic mode M3 are simultaneously performed so that the photographed image is recorded on both the photosensitive film 8 (step S13) and in the flash memory 23 (step S14). The photographing operation in the dual photographic mode M4 is the same as that of the electronic monitor photographic mode M2; and the image-recording operation performed in the dual photographic mode M4 is the same as that of the digital photographic mode M3. Accordingly, the explanations about the photographing operation and the image-recording operation in the dual photographic mode M4 are omitted.

As can be understood from the above description, the microcomputer 10 serves as a focal length setting device in accordance with an input from the switches 47 and 48, and as a distance-data detector in accordance with an input from the distance measuring device 30. Furthermore, the microcomputer 10 also serves as an actuating device for actuating the photographic lens zoom mechanism (first zoom mechanism) 300 and a viewfinder zoom mechanism (second zoom mechanism) 12.

As can be understood from the foregoing, according to the embodiment of the present invention, in the electronic monitor photographic mode M2 and the digital photographic mode M3 the user can view the object image at the set focal length on the LCD monitor 27 by operating the zoom button 46 since the size of the object image displayed on the LCD monitor 27 varies by the electronic zoom process performed in the electronic zoom circuit 25. Immediately after the user of the camera fully depresses the release button 42 while viewing the image on the LCD monitor 27, both the photographic lens 1 and the viewfinder 11 are synchronously driven so that the photographic lens 1 and the viewfinder 11 is set to the set focal length. Therefore, the exposure operation in which the mechanical shutter is released to form a latent image on the photosensitive film 8 is performed at the set focal length in the electronic monitor photographic mode M2, while the photographing operation in which the object image is photographed with the CCD 14 and stored in the flash memory 23 in the digital photographic mode M3. Accordingly, neither the photographic lens zoom mechanism 300 nor the viewfinder zoom mechanism 12 is actuated until the moment immediately before the object is photographed, so that the power consumption for the zoom mechanism of the camera can be reduced to extend the battery life.

Furthermore, according to the embodiment of the present invention, in the operations from step S107 to step S119 the microcomputer 10 starts increasing the counter value "m" one by one upon detecting that the release button 42 is half depressed; thereafter, when the counter value "m" has reached the predetermined value "M", it is assumed that the object to which the camera is currently directed toward will be photographed by the user, and then the microcomputer 10 actuates the photographic lens zoom mechanism 300 and the viewfinder zoom mechanism 12 so that the focal length of the photographic lens 1 and the viewfinder 11 is set to the set focal length which is determined by the user with the zoom button 46. This shortens the time necessary for setting the focal length of the photographic lens at the set focal length from the moment the release button 42 is fully depressed. Namely, the time lag between the moment the release button 42 is fully depressed and the moment the focal length of the photographic lens 1 is set to the set focal length is shortened. This achieves a quick response shutter release operation. This response characteristic is also the case in the digital photographic mode M3.

In the illustrated embodiment, the photographic lens zoom mechanism 300 of the photographic lens 1 and the viewfinder zoom mechanism 12 of the optical viewfinder 11 are synchronously driven. However, the present invention is not limited solely to this particular structure but can be applied to another type of camera having a photographic lens zoom mechanism and a viewfinder zoom mechanism which are provided independently of each other wherein the focal length of the photographic lens and the focal length of the viewfinder can be independently determined. In this case it is possible to operate only the optical view finder to perform the zooming operation thereof, without operating the zooming operation of the photographic lens zoom mechanism. In this case, it is also possible to photograph the object image of the viewfinder with a CCD upon zooming while displaying the object image on an LCD monitor. Accordingly, it is possible to omit the electronic zoom circuit. However, since the zooming operation which is not related directly to the photography at the optical view finder cannot be stopped, such a modified embodiment is less advantageous than the illustrated embodiment shown in FIGS. 1 through 5 in order to obtain a lower power consumption. The present invention can also be applied to an SLR camera in which the object image which is focused through the photographic lens of the camera is viewed as a viewfinder image through the viewfinder while a CCD is disposed in the photographic optical system so as to view the object image on an LCD monitor.

As can be understood from the foregoing, since the object image is displayed at the focal length set by the focal length setting device on the electronic monitoring device at all times before taking a picture, the angle of view of the object can be checked by the user of the camera at all times even if the zoom mechanism for driving the zoom lens is not driven. At the time of taking a picture, the focal length of the zoom lens is set at a desired focal length by the focal length setting device so that a picture taking through the zoom lens can be achieved. Accordingly, either the zoom mechanism of the zoom lens or the zoom mechanism of the optical viewfinder need not be driven until the moment immediately before the object is photographed, so that the power consumption for the zoom mechanism of the camera can be reduced to extend the life time of battery.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A camera comprising:

a zoom lens, having a first zoom mechanism, for photographing an image of an object;

a focal length setting device which controls said zoom mechanism to set a focal length of said zoom lens; and an electronic monitoring device for visually displaying said object image;

wherein said electronic monitoring device displays said object image which corresponds to said focal length set by said focal length setting device at all times; and wherein said focal length setting device actuates said zoom mechanism to set said focal length of said zoom lens at a set focal length only at the time a release button is depressed to initiate a photographing operation.

2. The camera according to claim 1, further comprising:

an optical viewfinder provided independently of said zoom lens;

an image pick-up device positioned in one of an optical system of said zoom lens and an optical system of said viewfinder; and a signal processing circuit for processing image signals output from said image pick-up device to display said image signals as an image on said electronic monitoring device;

wherein said signal processing circuit comprises an electronic zoom circuit for performing an electronic zoom process in which only a portion of image signals obtained from said image pick-up device are processed to display an enlarged image corresponding to said portion of image signals on said electronic monitoring device, said portion of image signals corresponding to said focal length set by said focal length setting device.

3. The camera according to claim 2, further comprising:

a second zoom mechanism for moving at least one optical element of said optical viewfinder; wherein said first zoom mechanism is for moving at least one optical element of said zoom lens;

said first zoom mechanism engages with said second zoom mechanism so that a focal length of said optical viewfinder varies according to the variation of said focal length of said zoom lens, and said image pick-up device is positioned in said optical viewfinder.

4. The camera according to claim 1, further comprising:

a distance measuring device for measuring an object distance of said object to obtain distance data;

a distance-data detector for repeatedly detecting said distance data; and an actuating device for actuating said first zoom mechanism, so that said focal length setting device actuates said zoom mechanism to set said zoom lens at said set focal length immediately after the number of detections of said distance-data detector reaches a predetermined number under a condition that a value of said distance data is within a predetermined value.

5. The camera according to claim 4, wherein said distance-data detector repeatedly detects said distance data at predetermined intervals when said release button of said camera is half depressed.

6. The camera according to claim 5, wherein said focal length setting device actuates said first zoom mechanism to set said zoom lens at said set focal length when said set focal length is smaller than a current focal length of said zoom lens.

7. The camera according to claim 6, wherein said focal length setting device does not actuate said first zoom mechanism when said set focal length is equal to or greater than said current focal length of said zoom lens.

8. The camera according to claim 1, wherein said focal length setting device actuates said first zoom mechanism to set said focal length of said zoom lens to said set focal length only at a time immediately before a shutter release.

9. The camera according to claim 1, wherein said camera comprises an optical viewfinder provided independently of said zoom lens.

10. The camera according to claim 1, wherein said camera comprises an SLR camera.

11. The camera according to claim 1, wherein said electronic monitoring device comprises an LCD monitor.

12. A camera comprising:

an optical zoom lens system;

an optical zoom viewfinder system;

a first zoom mechanism for moving at least one optical element of said optical zoom lens system to change the focal length thereof;

a second zoom mechanism for moving at least one optical element of said optical zoom viewfinder system to change the focal length thereof, said second zoom mechanism system engaging with said first zoom mechanism system so that a focal length of said optical zoom viewfinder system varies synchronously with variation of a focal length of said optical zoom lens system;

an image pick-up device positioned in one of said optical zoom lens system and said optical zoom viewfinder system;

an electronic monitor for visually displaying an object image obtained through said image pick-up device;

an electronic zoom device for performing an electronic zoom process in which a portion of said object image, obtained through said image pick-up device, is enlarged to be displayed on said electronic monitor; and a focal length setting device which controls said first zoom mechanism to set a focal length of said optical zoom lens system, wherein said electronic monitor displays said object image at said focal length set by said focal length setting device at all times, and wherein said focal length setting device actuates said first zoom mechanism to set said optical zoom lens system to said set focal length only at the time a release button is depressed to initiate a photographing operation.

* * * * *

UNITED STATES PATENT AND TRADEMARK OFFICE
CERTIFICATE OF CORRECTION

PATENT NO. : 6,819,357 B1
DATED : November 16, 2004
INVENTOR(S) : S. Miyadera et al.

It is certified that error appears in the above-identified patent and that said Letters Patent is hereby corrected as shown below:

Column 12,
Lines 34 and 35, after "mechanism" delete "system".

Signed and Sealed this

Second Day of May, 2006

JON W. DUDAS
*Director of the United States Patent and Trademark Office*